(12) United States Patent
Yang et al.

(10) Patent No.: US 11,126,403 B2
(45) Date of Patent: Sep. 21, 2021

(54) TRUE RANDOM NUMBER GENERATOR (TRNG) CIRCUIT USING A DIFFUSIVE MEMRISTOR

(71) Applicant: University of Massachusetts, Boston, MA (US)

(72) Inventors: Jianhua Yang, Hadley, MA (US); Qiangfei Xia, Amherst, MA (US); Hao Jiang, Sunderland, MA (US)

(73) Assignee: University of Massachusetts, Boston, MA (US)

( * ) Notice: Subject to any disclaimer, the term of this patent is extended or adjusted under 35 U.S.C. 154(b) by 225 days.

(21) Appl. No.: 16/367,623

(22) Filed: Mar. 28, 2019

(65) Prior Publication Data

US 2019/0303104 A1  Oct. 3, 2019

Related U.S. Application Data

(60) Provisional application No. 62/649,072, filed on Mar. 28, 2018.

(51) Int. Cl.
*G06F 7/58* (2006.01)
*H01L 45/00* (2006.01)
*H03K 3/84* (2006.01)
*H04L 9/08* (2006.01)
*H03K 19/20* (2006.01)

(52) U.S. Cl.
CPC ............ *G06F 7/588* (2013.01); *H01L 45/085* (2013.01); *H01L 45/1253* (2013.01); *H01L 45/1266* (2013.01); *H01L 45/146* (2013.01); *H03K 3/84* (2013.01); *H03K 19/20* (2013.01); *H04L 9/0869* (2013.01)

(58) Field of Classification Search
CPC ............ H01L 45/1233; H01L 45/1266; H01L 45/085; H01L 45/145; H01L 45/146; G11C 13/0011
See application file for complete search history.

(56) References Cited

U.S. PATENT DOCUMENTS 6,061,703 A    5/2000 DeBellis et al.
9,178,153 B2 * 11/2015 Zhang ..................... H01L 45/04
(Continued)

OTHER PUBLICATIONS

Baek, et al. Realization of vertical resistive memory (VRRAM) using cost effective 3D process. IEEE Tech. Dig. IEDM, pp. 737-740, (2011).

(Continued)

*Primary Examiner* — Allison Bernstein
(74) *Attorney, Agent, or Firm* — Fish & Richardson P.C.

(57) ABSTRACT

A true random number generator device based on a diffusive memristor is disclosed. The random number generator device includes a diffusive memristor driven by a pulse generator circuit. The diffusive memristor produces a stochastically switched output signal. A comparator circuit receives the stochastically switched output signal from the diffusive memristor and generates an output signal having a random pulse width. An AND gate logic circuit is driven by a clock signal and the output signal from the comparator circuit. The AND gate logic circuit produces a combined output signal. A counter circuit receives the combined output signal from the AND gate logic circuit and generates a random bit string output signal.

7 Claims, 6 Drawing Sheets

(56) References Cited

U.S. PATENT DOCUMENTS

| | | | | |
|---|---|---|---|---|
| 10,740,672 B2* | 8/2020 | Yang | ...................... | H01L 27/092 |
| 10,741,759 B2* | 8/2020 | Yang | ................... | H01L 45/1233 |
| 2019/0244088 A1* | 8/2019 | Yang | ....................... | H01L 27/24 |

OTHER PUBLICATIONS

Balatti et al. Physical unbiased generation of random numbers with coupled resistive switching devices. IEEE Transactions on Electron Devices 63:2029-2035 (2016).

Balatti et al., True random number generation by variability of resistive switching in oxide-based devices. IEEE J. Emerg. Sel. Topics Circuits Syst. 5:214-221 (2015).

Bessonov, et al. Layered memristive and memcapacitive switches for printable electronics. Nature Mater. 14:199-204 (2015).

Blackwell, "Applications of randomness in system performance measurement," Citeseer, (1998) (118 pages).

Brederlow, et al., A low-power true random number generator using random telegraph noise of single-oxde-traps. In Proc. ISSCC, pp. 1666-1675, (2006).

Bucci, et al., A high-speed oscillator-based truly random number source for cryptographic applications on a smart card IC. IEEE Trans. Computers 52:403-409 (2003).

Chang, et al., Building neuromorphic circuits with memristive devices. IEEE Circuits and Systems Magazine 13:56-73 (2013).

Chen, Utilizing the variability of resistive random access memory to implement reconfigurable physical unclonable functions. IEEE Electron Devices Letters 59:1172-1182 (2012).

Chua, Resistance switching memories are memristors, Applied Physics A, 102:765-783, (2011).

Chua, Memristor—The missing circuit element. IEEE Transactions on Circuit Theory 18:507-519 (1971).

Evans, D. The internet of things: how the next evolution of the internet is changing everything. Cisco (2011) (11 pages).

Fang, et al. Total ionizing dose effect of γ-ray radiation on the switching characteristics and filament stability of HfOx resistive random access memory. Appl. Phys. Lett. 104:183507 (2014).

Fujita, et al., Si nanodevices for random number generating circuits for cryptographic security, in 2004 IEEE International Solid-State Circuits Conference (ISSCC), pp. 294-295 (2004).

Fukushima, et al., Spin dice: A scalable truly random number generator based on spintronics, Applied Physics Express, 7:083001, (2014).

Gaba, et al., Memristive devices for stochastic computing, in 2014 IEEE International Symposium on Circuits and Systems (ISCAS), pp. 2592-2595 (2014).

Gaba, et al., Stochastic memristive deviecs for computing and neuromorphic applications. Nanoscale 5:5872-5878 (2013).

Gallo, et al., Inherent stochasticity in phase-change memory devices. In Proc. 46th Eur. Solid-State Device Res. Conf. (ESSDERC), pp. 373-376, (2016).

Guan, et al., On the switching parameter variation of metal-oxide RRAM—part I: physical modeling and simulation methodology. IEEE Transactions on Electron Devices 59, 1172-1182 (2012).

Hu, et al., Memristor Crossbar Based Neuromorphic Computing System: A Case Study, IEEE Transactions on Neural Network and Learning System (TNNLS), 25(10):1864-1878, (Oct. 2014).

Hu, et al., The stochastic modeling of TiO2 memristor and its usage in neuromorphic system design, in Asia and South Pacific Design Automation Conference (ASP-DAC), pp. 831-836 (2014).

Huang et al., A contact-resistive random-access-memory-based true random number generator. IEEE Electron Device Letters 33:1108-1110 (2012).

Kim, et al., Comprehensive Physical Model of Dynamic Resistive Switching in an Oxide Memristor, ACS nano, 8:2369-2376, (2014).

Lee, et al. A fast, high-endurance and scalable non-volatile memory device made from asymmetric Ta2O(5-x)/TaO(2-x) bilayer structures. Nat Mater 10:625-630 (2011).

Liu, et al., Experimental characterization of physical unclonable function based on 1kb resistive random access memory arrays. IEEE Electron Dev. Lett. 36:1380-1383 (2015).

Liu, et al., TRNG using time-dependent dielectric breakdown. Symp. VLSI Circuits Dig. Tech., Papers, pp. 216-217, (2011).

Medeiros-Ribeiro, et al., Lognormal switching times for titanium dioxide bipolar memristors: origin and resolution, Nanotechnology, 22:095702, (2011).

Midya, et al. Anatomy of Ag/Hafnia-based selectors with 1010 nonlinearity. Adv. Mater. Accepted (2016) (8 pages).

Petrie, et al., A noise-based IC random number generator for applications in cryptography. IEEE Trans. Circuits and Systems I 47:615-621 (2002).

Pi, et al., Cross point arrays of 8 nm×8 nm memristive devices fabricated with nanoimprint lithography. Journal of Vacuum Science & Technology B: Microelectronics and Nanometer Structures 31:06FA02 (2013).

Pi, et al., Nanoscale memristive radiofrequency switches. Nature comm. 6:7519 (2015).

Pickett, et al., Sub-100 fJ and sub-nanosecond thermally driven threshold switching in niobium oxide crosspoint nanodevices. Nanotechnology 23:215202 (2012).

Rukhin et al. A statistical test suite for random and pseudorandom No. generators for cryptographic applications. NIST, Gaithersburg, MD, USA, Special Publication 800-22, (2010) (131 pages).

Salaoru, et al., Coexistence of memory resistance and memory capacitance in TiO2 solid-state devices. Nanoscale Research Lett. 9:552 (2014).

Song, et al. Monolithic integration of AgTe/TiO2 based threshold switching device with TiN liner for steep slope field-effect transistors. IEEE Electron. Dev. Meet. (2016) (4 pages).

Srinivasan, et al. 2.4Ghz 7mW all digital PVT-variation tolerant true random number generator in 45nm CMOS. Symp. VLSI Circuits Dig. Tech., Papers, pp. 203-204, (2010).

Strukov, et al., The missing memristor found. Nature 453:80-83 (2008).

Tokunaga, et al., True random number generator with a metastability-based quality control. In Proc. ISSCC, pp. 404-405, (2007).

Torrezan, et al., "Sub-nanosecond switching of a tantalum oxide memristor," Nanotechnology, 22:485203, (2011).

Valov, et al., Electrochemical metallization memories-fundamentas, applications, prospects. Nanotechnology 22:254003 (2011).

Van der Leest, et al., Hardware intrinsic security to protect value in the mobile market. In Proc. Inf. Security Solutions Eur. Conf. (ISSE) pp. 188-198 (2014).

Vincent, et al., Spin-transfer torque magnetic memory as a stochastic memristive synapse, in Circuits and Systems (ISCAS), 2014 IEEE International Symposium pp. 1074-1077 (2014).

Vivoli, et al., Device-independent quantum random number generator with a photon pair source, arXiv preprint arXiv:1409.8051, (2014) (13 pages).

Wang, et al. Memristors with diffusive dynamics as synaptic emulators for neuromorphic computing. Nature Mater. 16:101-108 (2017).

Weber, et al., Internet of Things (vol. 12). Springer (2010) (156 pages).

Wei, et al. True random number generator using current difference based on a fractional stochastic model in 40-nm embedded ReRAM. IEEE Electron. Dev. Meet. (2016) (4 pages).

Williams, How we found the missing memristor, IEEE Spectrum, 45(12):28-35, (2008).

Xia, et al. Memristor-CMOS Hybrid Integrated Circuits for Reconfigurable Logic. Nano Letters 9:3640-3645 (2009).

Yang and Lu, Nanoscale resistive switching devices: mechanisms and modeling, Nanoscale, 5:10076-10092, (2013).

Yang, et al. A 23Mb/s 23pJ/b fully synthesized true-random-number generator in 28nm and 65nm CMOS. In Proc. ISSCC, pp. 280-281 (2014).

Yang, et al., Memristive devices for computing. Nature Nanotechnology 8:13-24 (2013).

Yasuda, et al. Physical random number generator based on MOS structure after soft breakdown. IEEE Journal of Solid-state circuits 39:1375-1377 (2004).

(56) References Cited

OTHER PUBLICATIONS

Yi, et al., Feedback write scheme for memristive switching devices, Appl. Phys. A, 102:973-982, (2011).
Yu, et al., Stochastic learning in oxide binary synaptic device for neuromorphic computing, Frontiers in neuroscience, vol. 7, (2013) (9 pages).

* cited by examiner

TRUE RANDOM NUMBER GENERATOR (TRNG) CIRCUIT USING A DIFFUSIVE MEMRISTOR

CROSS REFERENCE TO RELATED APPLICATIONS

This application claims the benefit of U.S. Provisional Patent Application No. 62/649,072, filed on Mar. 28, 2018, which is incorporated herein by reference in its entirety.

GOVERNMENT FUNDING

This invention was made with government support under Grant No. FA8750-15-2-0044 awarded by the U.S. Air Force Research Laboratory (AFRL), with government support under Grant No. FA9550-12-1-0038 awarded by the U.S. Air Force Office for Scientific Research (AFOSR), and with government support under ECCS-1253073 awarded by the National Science Foundation (NSF). The government has certain rights in the invention.

TECHNICAL FIELD

This application relates to diffusive memristors and a true random number generator circuit based on diffusive memristors that operates to generate a random bit sequence.

BACKGROUND

The internet of things (IoT) is a network of devices, sensors, and other items of various functionalities that interact and exchange data electronically. Because of rapid growth in the number of IoT objects (e.g., estimated to be 50 billion by 2020) and their reliance on cyberspace, the existing hardware infrastructure is increasingly vulnerable to a wide range of security threats. When software based data security methods are insufficient because these methods are vulnerable to attacks, hardware-based security systems become more important. Such hardware-based security systems include a true random number generator (TRNG), which is a hardware component that generates a string of random bits that can be used as a cryptographic key. A TRNG device may rely on intrinsic stochasticity in physical variables as a source of randomness. For example, thermal noise is often exploited by TRNG devices via oscillator jitter, resistor-amplifier-analog/digital converter chains, or metastable elements with capacitive feedback. Other approaches to generate random numbers using a TRNG device can include using telegraph noise, current fluctuation in oxide after soft breakdown, or time-dependent oxide breakdown process. However, prior TRNG devices have suffered from drawbacks in scalability, circuit complexity, or relied on post-processing such as a "Von Neumann corrector" to remove bias from the generated bit sequences.

SUMMARY

This disclosure describes a true random number generator (TRNG) device utilizing the stochastic delay time of threshold switching in a silver doped silicon oxide (Ag:SiO$_x$) diffusive memristor (where x is an integer ≥1, e.g., silicon oxide (x=1), silicon dioxide (x=2), silicon trioxide (x=3), silicon tetroxide (x=4), or silicon pentoxide (x=5)), which exhibits advantages in scalability, circuit complexity, and power consumption over prior memristor-based TRNG designs. As described in greater detail herein, the stochasticity in delay time can be attributed to the probabilistic process by which silver (Ag) particles detach from a Ag reservoir. These features are further demonstrated by nanoparticle dynamic simulation and analytical estimates. The TRNG device based on a diffusive memristor has a wide range of hardware security applications, especially in the expanding technology space in the Internet of Things.

As described herein, memristors, or resistive switching devices, are useful for a broad spectrum of applications because of their attractive properties, such as low power consumption, fast switching speed, high endurance, excellent scalability and CMOS-compatibility. The intrinsic variation in switching parameters of memristors can be helpful in stochastic computing and hardware security applications. A diffusive memristor as disclosed herein is a volatile device that relies on the diffusion dynamics of metal atoms in the memristive layer. The device switches to a low resistance state under a voltage pulse after a random delay time, and relaxes back to the high resistance state spontaneously upon removal of the applied electrical bias. The intrinsic stochasticity of the delay time is used as the source of randomness to build a TRNG device that includes a diffusive memristor, a comparator, an AND-gate and a counter.

Utilizing nanoparticle dynamic simulations and simple analytical estimates, it has been demonstrated that the stochasticity in delay time originates from the stochastic process by which Ag particles detach from a Ag reservoir before their transportation to form the conduction channel(s) within the silicon oxide (SiO$_x$) matrix. The new mechanism based on ionic/atomic motion indicates that the TRNG device may be less vulnerable to environmental variations such as radiation relative to other electron-based TRNG devices.

According to one innovative aspect of the subject matter described in this application, a diffusive memristor includes a bottom electrode, a top electrode formed opposite the bottom electrode, and a dielectric layer disposed between the top electrode and the bottom electrode, wherein the dielectric layer comprises silver doped silicon oxide (Ag:SiO$_x$). Additionally, a silver (Ag) layer is formed between the dielectric layer and the top electrode.

The diffusive memristor can include one or more of the following optional features. The silver layer can provide a reservoir of silver atoms that are used for forming conduction channels in the dielectric layer during switching. The silicon oxide (SiO$_x$) can be silicon dioxide (SiO$_2$). The bottom electrode can be formed from one of a platinum (Pt) layer, a palladium (Pd) layer or titanium nitride (TiN) layer. The top electrode can be formed from one of a platinum layer, a palladium layer or titanium nitride layer. The diffusive memristor can further include a bonding layer formed on the top electrode, wherein the bonding layer includes a platinum layer or a gold (Au) layer. The dielectric layer can include silver nanoparticles disposed within the silicon oxide. The diffusive memristor can be formed on a substrate.

According to another innovative aspect of the subject matter described in this application, a random number generator device includes a diffusive memristor device driven by a pulse generator circuit, a comparator circuit, an AND gate logic circuit and a counter circuit. The diffusive memristor device produces a stochastically switched output signal. The comparator circuit receives the stochastically switched output signal from the diffusive memristor device and generates an output signal having a random pulse width. The AND gate logic circuit is driven by a clock signal and the output signal from the comparator circuit. The AND gate logic circuit produces a combined output signal. The counter circuit receives the combined output signal from the AND gate logic circuit and generates a random bit string output signal.

The random number generator device can include one or more of the following optional features. The random bit string output signal can have a frequency that is a fraction of the frequency of the clock signal. The fraction can be one half. The counter circuit can be a single bit counter circuit. The counter circuit can be a multi-bit counter circuit.

The diffusive memristor device can be a silver doped silicon oxide ($Ag:SiO_x$) based diffusive memristor. The diffusive memristor device can include a dielectric layer formed from silver (Ag) doped silicon oxide ($SiO_x$), and disposed between a bottom electrode and a top electrode. The silicon oxide can be silicon dioxide ($SiO_2$). At least one of the bottom electrode or the top electrode can include a layer of one of platinum (Pt), palladium (Pd) or titanium nitride (TiN). The dielectric layer can include silver nanoparticles disposed within the silicon oxide, and the diffusive memristor device can include a silver layer formed between the dielectric layer and the top electrode. The diffusive memristor device can include a bonding layer formed on the platinum top electrode, wherein the bonding layer comprises one of a platinum layer and a gold (Au) layer. The diffusive memristor device can be formed on a semiconductor substrate. The semiconductor substrate can include a silicon (Si) wafer substrate. The diffusive memristor device can include a titanium (Ti) adhesion layer interposed between the silicon wafer substrate and the bottom electrode.

The diffusive memristor device can include a dielectric layer formed from a metal doped oxide, a metal bottom electrode and a metal top electrode, wherein the metal doped oxide is disposed between the metal bottom electrode and the metal top electrode. The dielectric layer can include metal nanoparticles disposed within the oxide. The diffusive memristor device can further include an additional metal layer formed between the dielectric layer and the metal top electrode. A metal corresponding to the metal nanoparticles can be same as a metal included in the additional metal layer. The metal can include one of silver (Ag), copper (Cu) or lithium (Li), and the oxide can include a silicon oxide ($SiO_x$). At least one of the metal top electrode or the metal bottom electrode can include one of platinum (Pt), palladium (Pd) or titanium nitride (TiN).

According to another innovative aspect of the subject matter described in this application, a diffusive memristor includes a bottom electrode, a top electrode formed opposite the bottom electrode, and a dielectric layer disposed between the top electrode and the bottom electrode, wherein the dielectric layer comprises an oxide doped with a metal. Additionally, layer of the metal is formed between the dielectric layer and the top electrode.

The diffusive memristor can include one or more of the following optional features. The oxide can include a silicon oxide ($SiO_x$). The metal can include one of silver (Ag), copper (Cu) or lithium (Li). At least one of the top electrode or the bottom electrode can include one of platinum (Pt), palladium (Pd) or titanium nitride (TiN).

A particular advantage of the TRNG device using a diffusive memristor is that its physical properties provide a device with stochastic behavior. Another advantage of the TRNG device using a diffusive memristor is that it can be combined with other circuit elements to create a true random number generator circuit suitable as a hardware implementation for security applications.

Compared with previous TRNG devices based on non-volatile memristors, the self-OFF-switching behavior in the diffusive memristor greatly reduces the energy consumption since no RESET process is required. The TRNG device disclosed herein is also advantageous in terms of circuit complexity because the randomness is generated and harvested directly using simple elements, in comparison to prior TRNG circuits. For example, a prior TRNG device, which was based on random telegraph noise (RTN) from the low resistance state of a tungsten (W)/titanium nitride (TiN)/titanium oxynitride (TiON)/silicon dioxide ($SiO_2$)/silicon (Si) memristor, proved difficult to activate and control because the probabilities of "0" and "1" were heavily dependent on the applied voltages. Another prior TRNG device, which used cycle-to-cycle and device-to-device voltage variations from copper (Cu)/aluminum oxide ($AlO_x$) and titanium (Ti)/hafnium oxide (HfOx) based memristors, respectively, required complicated probability tracking and careful tuning of the applied voltage/current. In addition, the device required a pair of SET and RESET pulses to generate each random bit since the $Cu/AlO_x$ and $Ti/HfO_x$ memristive devices are non-volatile. Due to the simpler circuit design, the diffusive memristor TRNG device disclosed herein can be easily incorporated into memory subsystems, greatly increasing the security and the area efficiency.

The random bits generated by the diffusive memristor based TRNG device pass all 15 NIST Special Publication 800-22 randomness tests without any post-processing. In contrast, none of the prior memristor-based TRNG devices passed all 15 NIST Special Publication 800-22 randomness tests even with post-processing of data, leaving the claimed true nature of the randomness debatable. For example, a prior TRNG device, which used randomness from small read-current fluctuation at certain resistance states in $TaO_x$ based devices, required sophisticated algorithms and circuits to ensure the quality of generated binary bits before they could pass the NIST tests.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figures 1A, 1B, 1C, 1D:
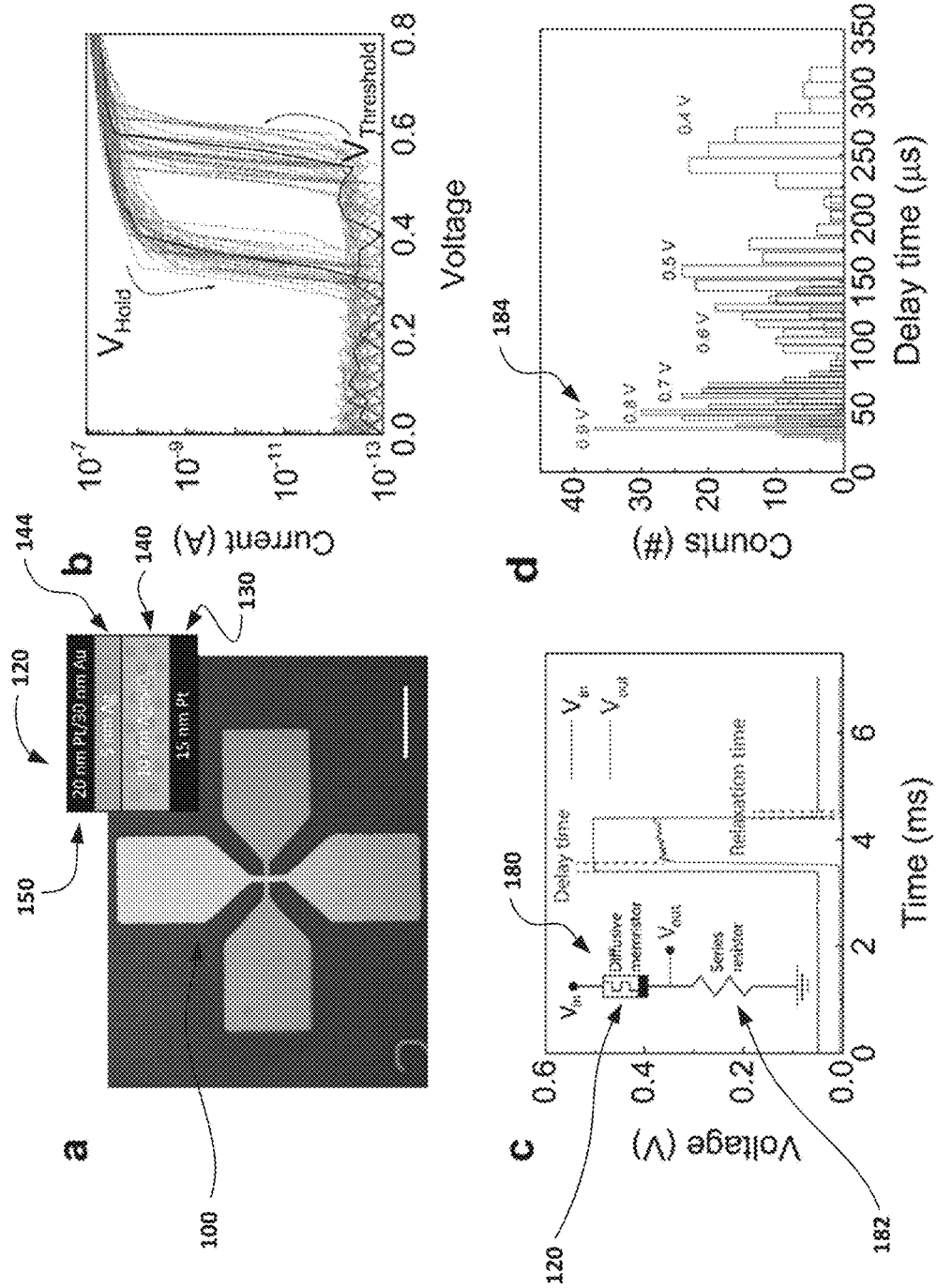
FIGS. 1a-1e illustrate a schematic diagram of a diffusive memristor, and graphs of the switching and delay time characteristics of the diffusive memristor.

FIGS. 1a-1e illustrate a schematic diagram of a diffusive memristor 120, and graphs of the switching and delay time characteristics of the diffusive memristor, exhibiting a stochastic threshold switching behavior for the diffusive memristor device 120. FIG. 1a schematically shows an optical microscopic image of a 5×5 µm² silver (Ag):silicon dioxide (SiO₂) cross-point device 100 that forms a Ag:SiO₂ diffusive memristor 120 used in conjunction with the true random number generator (TRNG) device described in greater detail below. The scale bar shown in FIG. 1a represents 50 µm.

The inset portion of FIG. 1a shows the geometry and layer structure of one implementation of the diffusive memristor 120. In some implementations, the diffusive memristor device 120 includes a metal bottom electrode layer 130, a metal top electrode layer 150, and a dielectric insulating switching layer 140 disposed between the top and bottom electrode layers. In some implementations, the top electrode 150 is formed of platinum (Pt) or gold (Au). In some implementations, the bottom electrode 130 is formed of platinum (Pt). In some implementations, the switching layer 140 is formed of Ag:SiO₂. In some implementations, the thickness of a Pt top electrode layer 150 is 20 nanometers (nm), or in a range thereabouts. In some implementations, the thickness of a Au top electrode layer 150 is 30 nm, or in a range thereabouts. In some implementations, the thickness of a Pt bottom electrode layer 130 is 15 nm, or in a range thereabouts. In some implementations, the thickness of a Ag:SiO₂ switching layer 140 is 10 nm, or in a range thereabouts.

In some implementations, a silver (Ag) layer 144 is formed and disposed between the Ag:SiO₂ switching layer 140 and the top electrode layer 150 to provide an additional supply of silver (Ag) for optimal operation of the switching layer 140. In some implementations, the thickness of the Ag layer 144 is 5 nm, or in a range thereabouts.

FIG. 1b is a graph showing 50 consecutive DC switching cycles of the diffusive memristor 120 connected in series with a 4.7 mega-ohm (MΩ) resistor. The graph of FIG. 1b shows that the Ag:SiO₂ based diffusive memristor device 120 does not require electroforming and exhibits reliable threshold under quasi-DC sweeps with a >10⁵ ON/OFF window, a sub-100 nano-ampere (nA) operation current and an extremely low (e.g., less than a pico-ampere (pA)) leakage current in the OFF state. The diffusive memristor device 120 abruptly reaches a low resistance state at a threshold voltage of around 0.5 volts (V) (ON-switching), followed by a spontaneous relaxation back to the high resistance state when the voltage sweeps back to below 0.3 V (self-OFF-switching), which demonstrates the volatility of the diffusive memristor device 120. Multiple switching sweeps of the diffusive memristor device 120 also shows cycle-to-cycle variations in threshold voltage, which demonstrates the stochastic nature of the switching behavior associated with the memristor device 120.

FIG. 1c is a graph showing pulse switching behavior of the diffusive memristor 120. Under a voltage pulse (300 microseconds (µs) in the case represented in the graph), the diffusive memristor device 120 abruptly turns ON after a finite delay time. The inset portion of FIG. 1c shows a circuit 180 that is used for the measurements with a resistor 182 connected in series with the diffusive memristor device 120. In some implementations, the resistor 182 is 120 kilo-ohm (kΩ). In greater detail, the graph of FIG. 1c shows the voltage across series resistor 182 ($V_{out}$) when a 300 µs pulse of 0.5 V ($V_{in}$) is applied to the memristor device 120. Under this specific applied input voltage $V_{in}$, there is a finite delay time (called incubation period, which is of the order of 130 µs) before the output voltage $V_{out}$ abruptly increases, indicating ON-switching of the diffusive memristor device 120. When the applied voltage $V_{in}$ is removed, the diffusive memristor device 120 relaxes to the OFF state within 100 µs, as read by a subsequent 50 mV pulse.

FIG. 1d is a graph showing a distribution of the delay time for different input pulse amplitudes (0.4 to 0.9 volts (V) at 50 hertz (Hz)). From the graph of FIG. 1d it can be understood that a higher voltage (e.g., 0.9 V) leads to a shorter average delay time with a narrower distribution (184). The stochastic delay time can be linked to the process of forming the silver (Ag) conduction channel(s). The delay time is also dependent on pulse frequency. A higher frequency leads to shorter delay times even with the same voltage amplitude and pulse width (0.5 V, 300 µs).

Figure 1E:
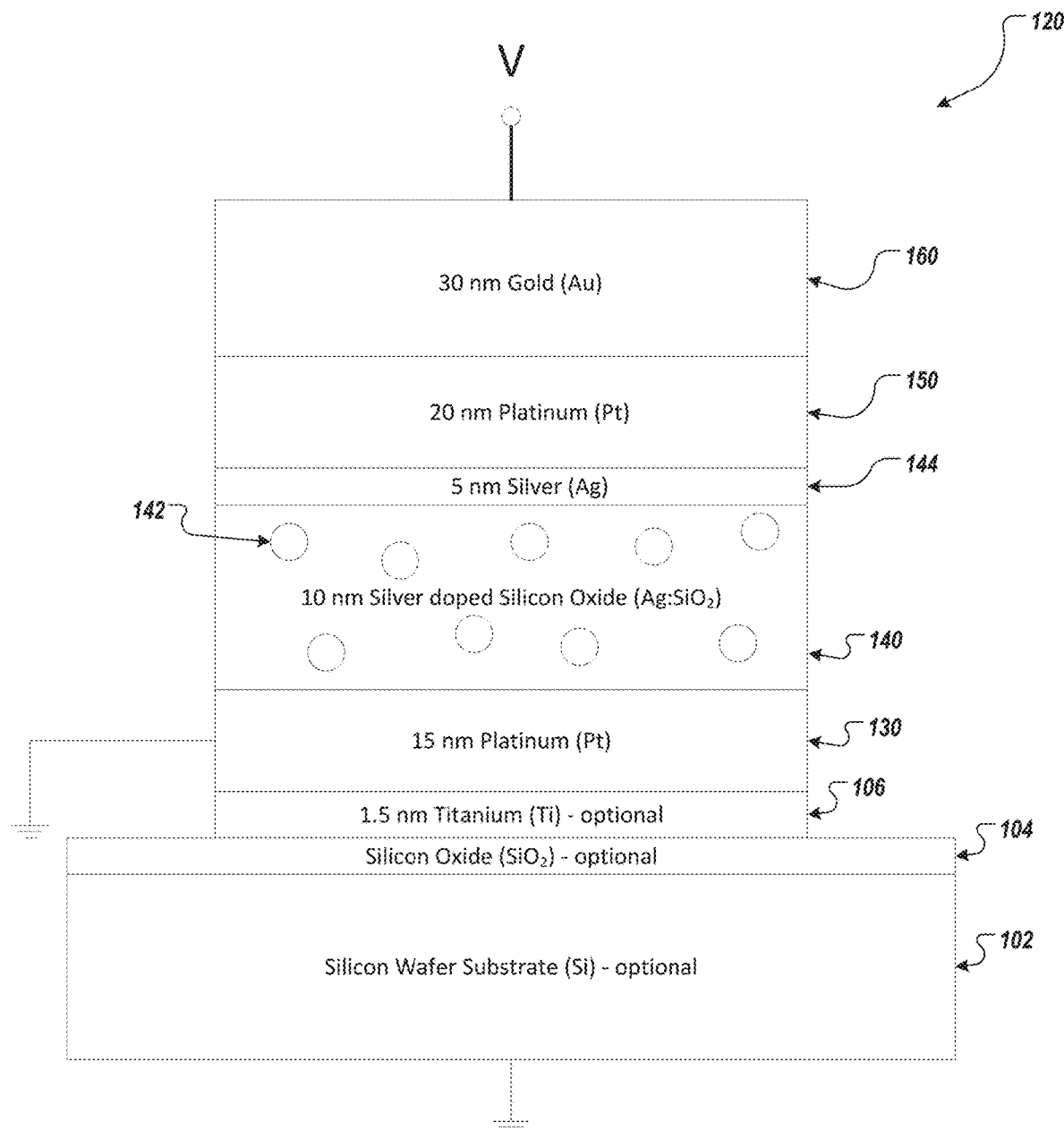

FIG. 1e illustrates a schematic diagram showing various layers of the diffusive memristor device 120. As shown in FIG. 1e, in some implementations, the diffusive memristor 120 is fabricated on a semiconductor substrate 102. In some implementations, the substrate 102 is a silicon (Si) wafer. In other implementations, semiconductor substrate 102 is made of a material other than Si wafer.

In some implementations, an oxide layer, such as silicon oxide (SiO₂) layer 104, is formed on the substrate 102. In some implementations, the circuit device 100 includes a titanium (Ti) layer 106 deposited on the surface of the silicon oxide layer 104 to create an adhesion surface for a bottom electrode 130. The Ti layer 106 has a thickness of 1.5 nm or in a range thereabout, in some implementations.

As described previously, in some implementations, the diffusive memristor device 120 includes a platinum (Pt) layer that creates the bottom electrode 130, and a silver doped silicon oxide (Ag:SiO₂) layer that creates a dielectric insulating switching layer 140. In some implementations, the dielectric insulating switching layer 140 includes silver nanoclusters 142. In such implementations of the diffusive memristor device 120, an additional silver (Ag) layer 144 is formed on the dielectric insulating layer 140. A platinum (Pt) layer is formed on the silver layer 144 that creates the top electrode 150. In some implementations, a gold (Au) layer that creates a bonding electrode 160 is formed on the top surface of the top electrode 150. The bonding electrode 160 is included for better contact with measurement probes.

In the implementation shown in FIG. 1e, the Pt layer forming the bottom electrode 130 is fabricated to a thickness of approximately 15 nm, the Ag:SiO₂ layer that creates the dielectric insulating switching layer 140 is fabricated to a thickness of approximately 10 nm, the additional Ag layer 144 is fabricated to a thickness of approximately 5 nm, and the Pt layer forming the top electrode 150 is fabricated to a thickness of approximately 20 nm. The optional Au layer forming the bonding electrode 160 is fabricated to a thickness of approximately 30 nm. Variations on the thickness of each layer are also within the scope of the present invention.

The Ag layer 5 nm 144 that is formed and disposed between the Ag:SiO₂ switching layer 140 and the Pt top electrode 150 operates as a reservoir of silver (Ag) atoms to avoid any silver (Ag) depletion during switching. In some implementations, after fabrication, the silver (Ag) doping ratio in the Ag:SiO₂ switching layer 140 is around 17% (atomic ratio), as determined by X-ray photoelectron spectroscopy (XPS). In some implementations, a 10 nm thick Ag:SiO₂ switching layer 140 deposited on a thin $SiN_x$ membrane includes dense silver (Ag) nanoclusters 142 that are uniformly dispersed in the SiO₂ matrix of the switching layer 140. The majority of the Ag nanoclusters 142 are 2 to 5 nm in diameter, with a few outliers of 10 nm.

Figures 2A, 2B:
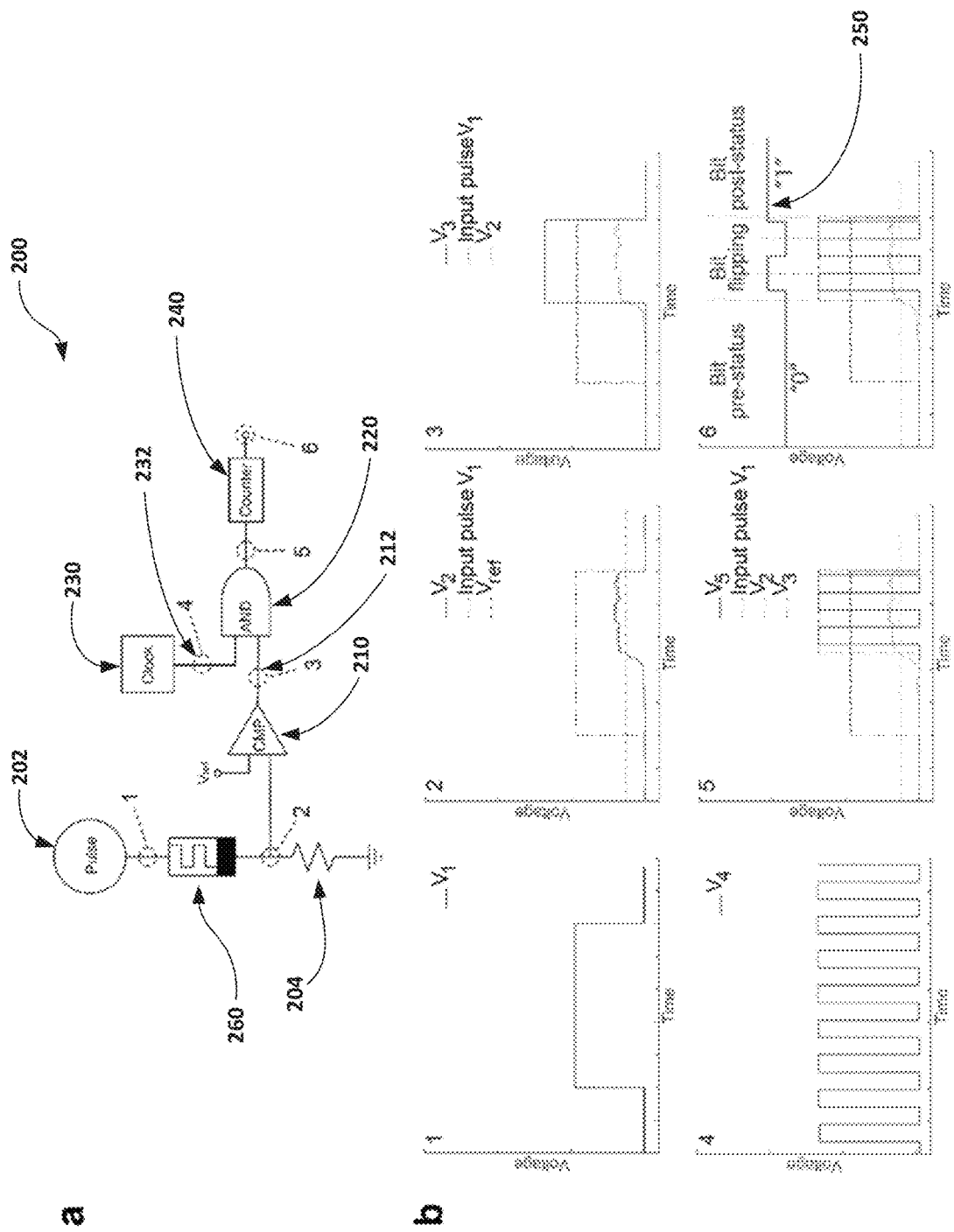
FIGS. 2a-2b illustrate a circuit diagram of a diffusive memristor based true random number generator (TRNG) circuit and graphs of waveforms corresponding to each stage of the circuit.

FIGS. 2a-2b illustrate a circuit diagram of a diffusive memristor based true random number generator (TRNG) circuit 200, and graphs of waveforms corresponding to each stage of the circuit, respectively. As shown in FIG. 2a, the TRNG device 200 includes a diffusive memristor 260, a voltage source 202, a series resistor 204, a comparator (CMP) 210, an AND gate 220, a clock circuit 230, and a counter 240. In some implementations, the diffusive memristor 260 is an example of the diffusive memristor 120 described with respect to FIGS. 1a-1e. Accordingly, in the following sections, the description of the TRNG device 200 is with respect to the Ag:SiO$_2$ diffusive memristor 120. However, the TRNG device 200 can include other types of diffusive memristor 260 in other implementations. For example, in some implementations, the diffusive memristor 260 is an example of the diffusive memristor 500 described with respect to FIG. 5.

FIG. 2b shows a series of six graph panels depicting schematic pulse waveforms at each stage of the circuit (as labeled in FIG. 2a at each of the numbered nodes 1-6), and illustrates the working principle of the diffusive memristor TRNG circuit 200. The stochastic delay time of the diffusive memristor 260 leads to variations of the pulse width (shown at node 3; comparator output 212) and then random numbers of clock pulses that are sent to the counter 240 (shown at node 5). The bit status (counter 240 output shown at node 6) before, during and after flipping is labeled in red in graph Panel 6. The bit flipping is triggered by the rising edge of the clock signal and hence the bit flipping frequency is half of the clock frequency. The output of the counter 240 is random due to the random times of bit flipping, as determined by the random numbers of clock pulses sent to the counter 240 (V$_5$).

The stochastic delay time of the Ag:SiO$_2$ based diffusive memristor 260 during ON-switching is utilized as the source of randomness for the TRNG circuit 200. In some implementations, the voltage source 202 generates a voltage pulse (V$_1$) of fixed width that is applied across the diffusive memristor 260 and series resistor 204 (FIG. 2b, Panel 1). Under the applied voltage, the diffusive memristor 260 is turned ON and hence the output voltage (V$_2$) across the series resistor 204 suddenly increases after a stochastic delay time (FIG. 2b, Panel 2). When voltage V$_2$ is higher than a reference voltage to the comparator 210 (V$_{ref}$), the comparator output voltage (V$_3$) goes to a logic high level (FIG. 2b, Panel 3), and V$_2$ and V$_3$ fall back to zero when the single input pulse (V$_1$) ends.

Since the delay time characteristic of the diffusive memristor 260 is random, the output voltage pulse V$_3$ (212) from the comparator 210 has a random width. Voltage V$_3$ (FIG. 2b, Panel 3) and a high frequency clock signal 232 (V$_4$) from the clock circuit 230 (FIG. 2b, Panel 4) are sent to inputs of the AND gate 220, whose output voltage pulses (V$_5$ in FIG. 2b, Panel 5) are sent to the counter 240. The graph in FIG. 2b, Panel 6 shows the binary bit (counter 240 output at node 5, in red (250) in FIG. 2b, Panel 6) stays at its pre-status ("0") before the diffusive memristor 260 is turned ON, flips rapidly (triggered by clock signals 232) until the single input pulse (V$_1$) from the voltage source 202 ends and then stays at its post-status ("1"). The bit flipping in the counter 240 is triggered by the rising edge of the clock signal 232, and hence has a frequency half of the clock frequency (232). The bit on which the counter 240 stops is random, because the stochastic delay time of the diffusive memristor 260 leads to a random pulse width from the comparator 210 (V$_3$) and thus a random number of clock pulses from the clock circuit 230 that are sent to the counter 240. In some implementations, the random bit generation rate of the diffusive memristor based TRNG circuit 200 is increased using a multi-bit counter, with which one stochastic volatile switching event can produce more than one binary bit.

Figures 3A, 3B, 3C:
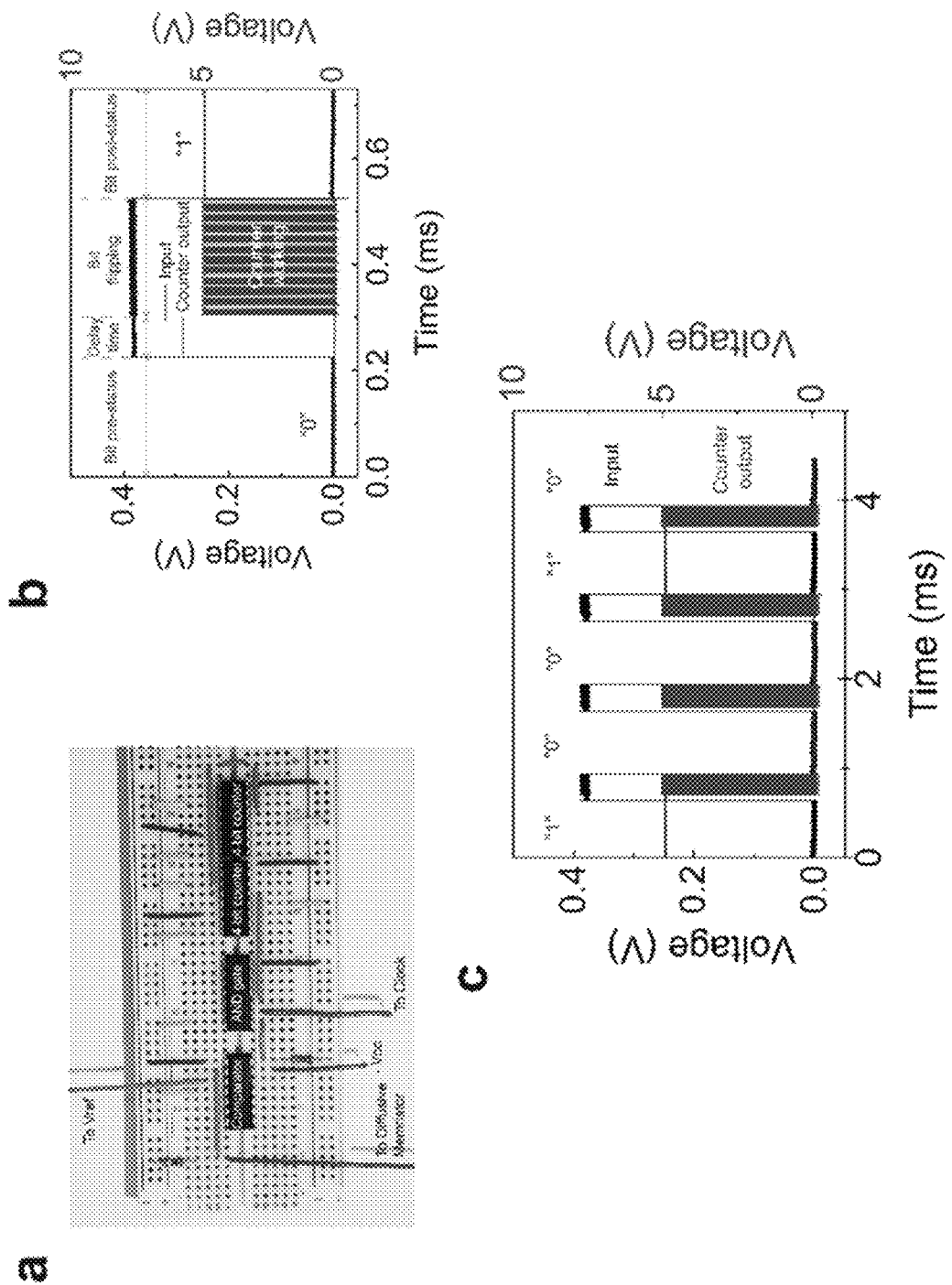
FIGS. 3a-3c illustrate an experimental demonstration of the diffusive memristor based TRNG circuit along with graphs showing the monitored output of a counter forming part of the circuit.

FIGS. 3a-3c illustrate an experimental demonstration of the diffusive memristor based TRNG circuit 200 circuit along with graphs showing the monitored output of a counter forming part of the circuit. FIG. 3a shows a photo of a circuit built on a breadboard. FIG. 3b shows the monitored output of one counter, for example counter 240, in response to an input voltage pulse (1 kHz) applied, for example by voltage source 202, to the diffusive memristor 2600. FIG. 3c shows the monitored output (of counter 240) of one random binary output flipping from "1"→"0"→"0"→"1"→"0" over continuous switching cycles.

The diffusive memristor based TRNG circuit 200 was experimentally implemented by a simple circuit built on a breadboard (FIG. 3a). To demonstrate the operation of the diffusive memristor based TRNG circuit 200, the lowest order bit at the output of the counter 240 was monitored by an oscilloscope during operation (FIG. 3b). A pulse train of constant amplitude (V$_1$=0.4 V) with a pulse width of 300 µs and 700 µs spacing (i.e., 1 kHz frequency) was generated by the voltage source 202. As shown in FIG. 3b, the bit was initially at a low logic level ("0"). After the delay time (once the diffusive memristor 260 switched to the ON state) the counter 240 started receiving clock signals (at 4 MHz) from the clock circuit 230 and the bit flipped rapidly between low and high level ("0" and "1"). At the end of the input pulse (V$_1$), the counter 240 stopped counting and kept its last state "1" until receiving the next counting signal. This "1" was the output bit read by a microcontroller connected to the TRNG circuit 200. Due to the stochastic nature of the delay time for each cycle, the output of the counter 240 after each pulse was totally unpredictable and flipped randomly between "0" and "1". FIG. 3c shows the monitored binary bits randomly flipped from "1"→"0"→"0"→"1"→"0" during four continuous ON-switching cycles.

To assess the performance of the diffusive memristor based TRNG circuit 200, randomness testing for 76 million binary bits was carried out using the standard statistical testing package developed by the National Institute of Standards and Technology (NIST 800-22 test suite). A microcontroller's built-in 16-bit counter with 11.0592 MHz crystal oscillation frequency was used as the clock signal (e.g., representing the output signal of clock circuit 230) and the 6 lowest-order bits were collected. Each input pulse provides 6 random binary bits, for a total bit generation rate of 6 kbs$^{-1}$. According to the test protocol, 76 million bits were collected and divided into 76 sequences (1 million bits each) for the NIST tests, which returned two statistics: P-value (except non-overlapping-template and random excursions variant), and pass rate. The bits are considered random and successfully pass the test only if the P-value is greater than 0.0001 and the pass rate exceeds the minimum value defined by NIST. As shown in Table 1, the diffusive memristor based TRNG circuit 200 passed all 15 NIST tests without any post-processing.

TABLE 1

| Parameter | P-Value | Pass Rate | Min. pass rate | SUCCESS/FAILURE |
| --- | --- | --- | --- | --- |
| 1. Approximate Entropy | 0.00983 | 75/76 | 72/76 | SUCCESS |
| 2. Block Frequency | 0.768138 | 75/76 | 72/76 | SUCCESS |
| 3. Cumulative Sums | 0.046525, 0.426525 | 73/75, 74/76 | 72/76 | SUCCESS |
| 4. FFT | 0.739918 | 75/76 | 72/76 | SUCCESS |
| 5. Frequency | 0.477737 | 74/76 | 72/76 | SUCCESS |
| 6. Linear Complexity | 0.350485 | 76/76 | 72/76 | SUCCESS |
| 7. Longest Run | 0.042413 | 76/76 | 72/76 | SUCCESS |
| 8. Non Overlapping Template | — | 11052/11248 | 10656/11248 | SUCCESS |
| 9. Overlapping Template | 0.592591 | 75/76 | 72/76 | SUCCESS |
| 10. Random Excursions | — | 360/368 | 344/368 | SUCCESS |
| 11. Random Excursions Variant | — | 818/828 | 774/828 | SUCCESS |
| 12. Rank | 0.094936 | 76/76 | 72/76 | SUCCESS |
| 13. Runs | 0.042413 | 75/76 | 72/76 | SUCCESS |
| 14. Serial | 0.739918, 0.795464 | 76/75, 76/76 | 72/76 | SUCCESS |
| 15. Universal | 0.000954 | 76/76 | 72/76 | SUCCESS |

Figures 4A, 4B, 4C, 4D, 4E, 4F, 4G, 4H, 4I:
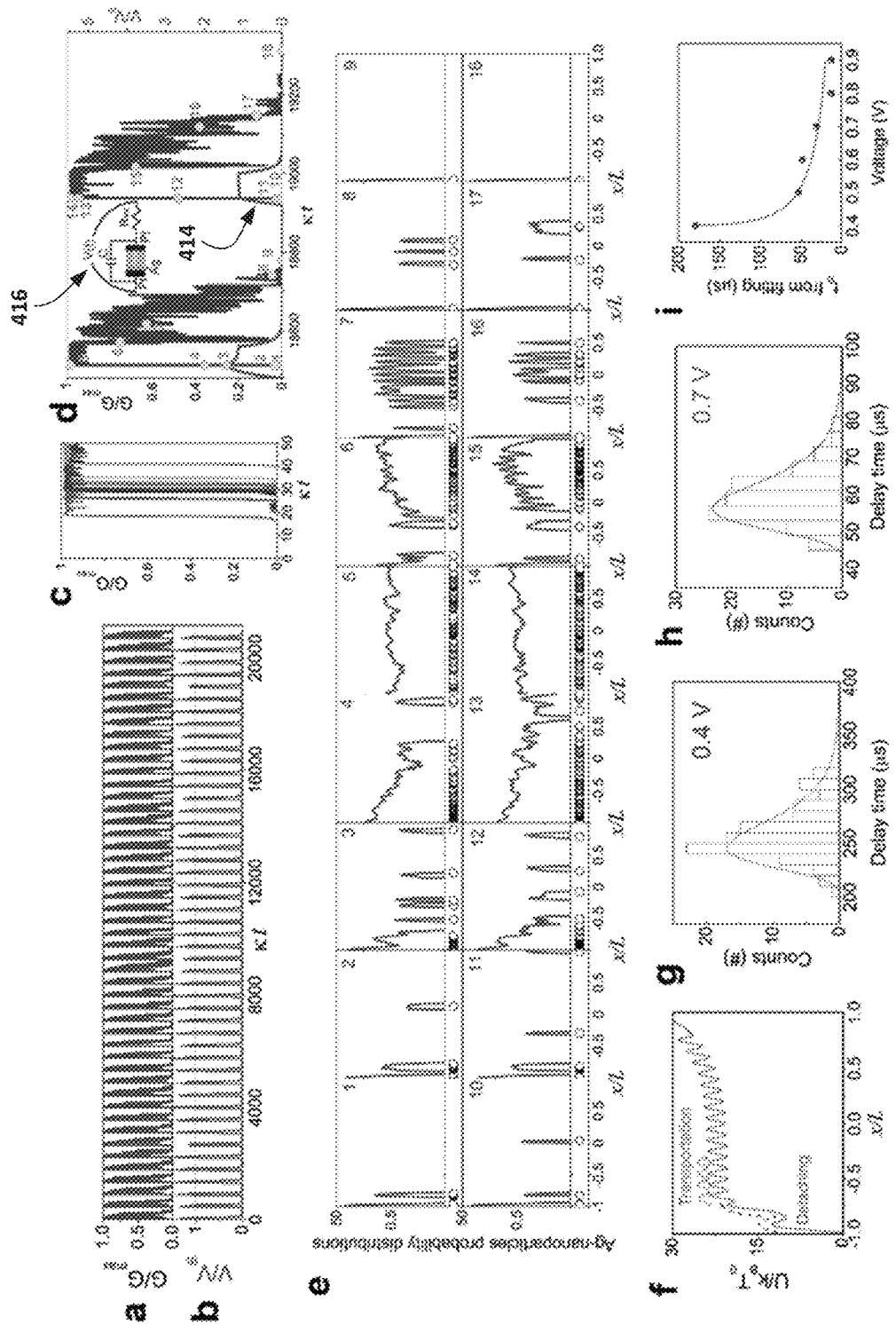
FIGS. 4a-4i illustrate graphical data showing the physical origin of stochastic delay time associated with the diffusive memristor.

FIGS. 4a to 4i illustrate graphical data showing the physical origin of stochastic delay time associated with the diffusive memristor. The stochastic delay time is clarified by nanoparticle dynamics simulations. FIG. 4a is a signal graph that shows the switching of the simulated memristor conductance when forty eight (48) rectangular voltage pulses are applied, with conductance normalized by the maximum memristor conductance, and FIG. 4b is a signal graph that shows the variation of voltage across the memristor, normalized by the threshold voltage $V_{th}$. FIG. 4c shows the switching to the low resistive state at time measured from the beginning of the corresponding pulses. The randomness of the resistive switching can be understood from this graph. FIG. 4d shows the two chosen resistive switches with different delay time and FIG. 4e shows corresponding particle probability distributions (over graph panels numbered 1-18) at points marked on FIG. 4d by yellow points having corresponding numbers 1-18. The inset in FIG. 4d shows the circuit model used during the simulation, and specifically shows that the diffusive memristor 120 is connected with a parallel capacitor and a series resistor. FIG. 4f shows potential normalized by thermal fluctuations across the sample used in the simulations. The delay time is composed of charging time of capacitor, time of silver (Ag) particles detaching from the silver (Ag) reservoir (144) and the silver (Ag) transportation time until the formation of conduction channel(s) within the switching layer 140, while the stochasticity is mainly attributed to the stochastic detaching process associated with the silver (Ag) particles.

For the simulations depicted in FIGS. 4a to 4e, the following voltage pulse parameters were used: voltage pulse duration $\kappa t_\rho=80$ (allowing enough time to switch to low resistive state for every pulse), inter-pulse interval $\kappa \Delta t=360$ (allowing enough times to relax) and voltage amplitude $V_{am}/V_{th}=1.5$, potential versus temperature as in FIG. 4f (all times measured in unit of thermal relaxation time $1/\kappa$). FIGS. 4g and 4h show the experimental delay time distributions in micro seconds under 0.4 V in FIG. 4g and 0.7 V in FIG. 4h fitted by equation (2). FIG. 4i shows the fitting curve of $t_0$ vs. pulse amplitudes according to equation (3). The fitted probability distributions appear to be consistent with experimental results.

With continued reference to FIGS. 4a to 4i, the physical origin of stochastic switching delay time in a $Ag:SiO_2$ diffusive memristor is described in more detail. The physical origin and stochastic nature of the delay time is demonstrated by nanoparticle dynamical simulations, performed utilizing a generalized model that links electrical, nano-mechanical and thermal degrees of freedom. In these simulations, multi-switching-cycles under a train of pulses are simulated, unlike previous studies that mainly focused on response to a single pulse. In addition to the equations for heat and Ag-nanoparticle dynamics used in previous model, both external and intrinsic memristor capacitances are taken into account to better resemble real conditions during experiments. FIGS. 4a and 4b show the simulation results of forty eight (48) volatile switching cycles: switching of conductance G (normalized by its maximum value) is shown in FIG. 4a, while the voltage across the memristor is shown in FIG. 4b. With the same input pulses, random delay time during ON-switching is observed in FIG. 4c (with time counted from the moment when the corresponding voltage pulse was applied). The delay time statistics from simulations confirm a shorter delay time and a narrower distribution with increasing applied voltage amplitudes, similar to experimental results shown in FIG. 1d. Moreover, the obtained distribution statistics of simulated and measured delay times are very similar.

Evolution of silver (Ag) nanoparticle density distribution during two typical switching cycles (with G(t) presented in FIG. 4d) with quite different delay times is shown step by step in FIG. 4e (panels 1-18). A circuit model 416 used during the simulation is schematically shown in the inset in FIG. 4d. The circuit model 416 includes a diffusive memristor, a parallel capacitor and a series resistor. The capacitor represents capacitances from the device itself and also from the external circuits during electrical measurements such as cables and breadboards. As mentioned above, a series resistor is used to limit the operation current. When a voltage is applied, the voltage across the memristor gradually increases (FIG. 4d, the red curve 414). As soon as the voltage exceeds the threshold $V_{th}$, silver (Ag) nano-particles can randomly detach from the silver (Ag)-electrode and form a large cluster nearby (FIG. 4e, Panel 1). Some particles escape from the cluster and start to diffuse towards the right electrode Pt (shown on the right side of memristor; inset FIG. 4d) driven by the electric field (FIG. 4e, Panel 2) and the memristor resistance starts to decrease resulting in higher energy dissipation. This results in positive feedback: more particles travelling towards the platinum (Pt) electrode enhance the device conductance, so the heat dissipation and temperature increase activating even more particle diffusion towards the platinum (Pt) electrode. Finally, some silver (Ag) particles arrive at the platinum (Pt) electrode and more and more particle start to diffuse from the large left cluster (FIG. 4e, Panel 3).

After that, silver (Ag) nanoparticles gradually migrate towards the other terminal (forming bridge spans, FIG. 4e, Panel 4) and the device resistance continuously drops (and its conductance rises, FIG. 4d) until the formation of silver (Ag) conduction channel(s) that bridge the two terminals and bring the device to the ON state (FIG. 4e, Panel 5). After the voltage pulse is off, the capacitor gradually discharges and the voltage across the memristor decays (FIG. 4d). The conduction channel breaks (FIG. 4e, Panel 6), then is further fragmented (FIG. 4e, Panel 7), and silver (Ag) particles are gradually absorbed by the silver (Ag) electrode driven by interfacial energy minimization (FIG. 4e, Panels 8, 9), bringing the device to the OFF state. For the case of a shorter delay (second cycle in FIG. 4d), particles detach faster and start to diffuse just after detaching from the silver (Ag)-electrode (FIG. 4e, Panels 10-14), while the relaxation part of the cycle (FIG. 4e. Panels 15-18) is almost the same as described above.

FIG. 4f shows the potential profile used for the simulation, which includes two energy scales: the interfacial energy responsible for detaching the Ag-electrode and formation of large metallic clusters near the device terminal and a weaker nanoparticle-pinning energy with many smaller wells between the electrodes. The delay time during ON switching includes three steps: (i) the formation of a voltage across the device terminal (charging capacitor), (ii) silver (Ag) nanoparticles escaping from the big potential wells associated with interfacial energy, corresponding to detaching from the left Ag reservoir/large Ag-cluster (FIG. 4e, Panels 1-2) and then (iii) transportation through the small pinning wells to the other terminal until the formation of silver (Ag) bridge(s) (FIG. 4e, Panels 2-4). The time needed to charge the capacitor (i) is deterministic in nature and delays setting voltage across the device, while the time for silver (Ag) transportation (iii) is very short (from spot 2 to spot 4, due to a fast increase in device temperature and, thus, very fast diffusion) and in practice can be neglected. Hence the stochasticity in delay time is mainly due to the silver (Ag) detaching process (ii). The escape time ($t_e$) of a particle from the primary potential well (interfacial barrier) is naturally random and its distribution can be estimated by solving the Fokker-Plank equation with parabolic well and delta-function (for classical) or ground state (for quantum) initial distribution of silver (Ag)-nanoparticles in the potential minima. In classical limit the delay time distribution has the form shown by equation (1):

$$P(t_e) = \frac{Ce^{-\frac{A}{1-e^{-2kt_e}}}}{\sqrt{1-e^{-2kt_e}}} (e^{2kt_e} - 1)^{-1} \quad (1)$$

In equation (1), A and k are fitting parameters related to potential curvature and depth of the well, and C is a normalization constant. Adding the deterministic RC effect, the distribution of stochastic delay time (t) can be determined using equations (2) and (3):

$$P(t_e) = \frac{Ce^{-\frac{A}{1-e^{-2k(t-t_0)}}}}{\sqrt{1-e^{-2k(t-t_0)}}} (e^{2k(t-t_0)} - 1)^{-1} \quad (2)$$

$$t_0 = -\tau_0 \ln\left(1 - \frac{V_{tr}}{V}\right) + t_1 \quad (3)$$

where $\tau_0$ is characteristic "RC" time, $V_{tr}$ is a threshold when the memristor can switch to its low resistance state if $V(t) > V_{tr}$, and $t_1$ is associated with any other deterministic voltage-independent delays (e.g., characteristic temperature relaxation time). FIGS. 4g and 4h show the fitting results for the distribution of delay time under 0.4 V and 0.7 V from experiments based on Equation (2) while FIG. 4i shows the relationship between $t_0$ and applied voltages with a curve fit based on Equation (3). Similarly, a very good agreement was obtained for the simulated distribution of delay time, and RC deterministic time delays $t_0$, thus, justifying a good agreement between experimental and simulated data. The results show that the stochastic process of silver (Ag) atoms detaching from the silver (Ag) reservoir is responsible for the stochasticity in delay time during ON-switching.

As discussed above, earlier approaches utilizing switching variations to build TRNG circuits have defined a threshold value for some switching characteristic (for example SET voltage or read current). In earlier approaches, the TRNG circuit will output a logic level 1 if the measured value exceeds the threshold, and output a logic level 0 otherwise. Complicated feedback and post-processing (such as von Neumann corrections) are needed to correct the ratio of 1 s to 0 s (bias) and improve the randomness to acceptable standards before running NIST tests. This is because the distribution of 0 and 1 bits generated is highly dependent on the exact distribution of the measured characteristic. If the median value shifts over time, then 0 and 1 outputs will not be equally probable.

In contrast to the earlier approaches, the diffusive memristor based TRNG circuit, e.g., TRNG device 200, more efficiently exploits variations in switching characteristics as sources of randomness, which is distinct from the previous threshold-value approaches. As shown in FIG. 2, the measured delay time is used to determine how many clock pulses are sent to a counter, e.g., counter 240. As a result, the mapping between analog delay time and a binary value implemented by the circuit 200 is highly chaotic when the clock frequency is fast. Each bit generated by the circuit 200 is very sensitive to even small variations in delay time, which makes the reliability of the described approach immune to global shifts/drifts in the delay time distribution with fast enough clock signal. The described circuit and method accordingly exploits intrinsic stochasticity in memristive devices for security applications.

In some implementations, pulse parameters are chosen to optimize bitrate and ensure the randomness of bits generated by the TRNG circuit 200. For example, in some implementations, a sufficiently large pulse width and amplitude is selected such that the TRNG devices turn ON every cycle. This prevents situations where there is no switching to the low resistive state during pulses, which can cause no random number generation. In some implementations, the interval between pulses is increased so that the device is always fully relaxed and nonzero delay time occurs during every ON-switching cycle. This prevents situations where there is insufficient time to relax to the high resistive state during the inter-pulse interval, which can also cause no random number generation.

Randomness from volatile switching with a high ON/OFF ratio is easier to exploit than small noises or current fluctuations. As a result, simpler circuits are required. The diffusive memristor TRNG circuit 200 can be built into memory subsystems, reducing chip area and increasing security. As revealed by simulations, the stochasticity is derived from the process of ionic motion, indicating that the diffusive memristor TRNG circuit 200 is more resistant to harsh environments than other electron-based TRNGs. Moreover, when the TRNG is operating, varying temperature affects the distribution by shifting its maximum towards lower time delays. However, the high frequency clock used to generate random numbers ensures that the randomness is not affected.

The current bit generation rate using the diffusive memristor TRNG circuit 200 is 6 kbs$^{-1}$, which is sufficient for many encryption applications, such as Secure Session Layer (SSL) keys, car keys, and identification cards. In some implementations, to further increase the bit rate for other applications, a counter with more bits is used in the TRNG circuit. A higher frequency clock signal causes higher order bits to flip frequently to guarantee the generation of high quality random bit streams. This, however, comes at the cost of increased power consumption.

In some implementations, the diffusive memristor TRNG circuit 200 is combined with a linear-feedback shift register (LFSR) for higher bit rates with little increase in power consumption. The bitrate can be readily increased by 50 times (to around 300 kbs$^{-1}$) implementing this method. In some implementations, a bitrate over 100 MHz is achieved by using a LFSR with more bits. In addition to circuit solutions, device engineering that leads to a higher switching speed of the diffusive memristors also improve the bitrate without changing the TRNG circuit. For example, the switching matrix can be changed. Alternatively, other memristive devices can be used. For example, niobium dioxide (NbO$_2$) could be a good candidate for the TRNG circuit because of its sub-ns switching speed, albeit with relatively high operation current (around 300 µA) and voltage (around 1.5 V), even with small device size. In some implementations, parallel operation of several diffusive memristor TRNG devices leads to increased bitrates by simultaneously generating multiple random sequences. In some implementations, circuit area is reduced by three dimensional (3D) vertical stacking of the TRNG devices.

The operations of the diffusive memristor TRNG circuit (such as circuit 200) can be further characterized in response to temperature effects and long pulse cycling. The diffusive memristor TRNG circuit 200 still functions satisfactorily and passes the NIST tests even at 85° C. The experiment/testing collected 11 M binary bits under 1 kHz pulses (voltage amplitude: 0.5 V and pulse width: 300 µs). Unlike in operation at room temperature, only the 3 lowest-order bits can be collected, which means the bitrate decreases from 6 kbs$^{-1}$ to 3 kbs$^{-1}$ at 85° C. However, this will not be a problem if the clock frequency is increased accordingly. Utilizing a clock signal greater than 8×11.0592=88.4736 MHz, it is possible to keep the bitrate steady at 6 kbs$^{-1}$. The required clock frequency is dependent on the spread of delay time, and so the decreased bitrate could be a result of the decreased standard deviation of delay time at high temperatures.

Possible degradation due to long pulse cycling is the other concern for the memristive switching based TRNG circuit. For example, in one case, 54 million bits were collected from a single diffusive memristor before the device failed and got stuck at the ON state (each cycle produced 6 random bits with endurance of around 10$^7$ cycles). However, the randomness in memristors is sufficient to generate high quality random bits even after long cycling using the method and circuit described herein, in contrast to previous attempts to build memristive switching based TRNG circuits.

Figure 5:
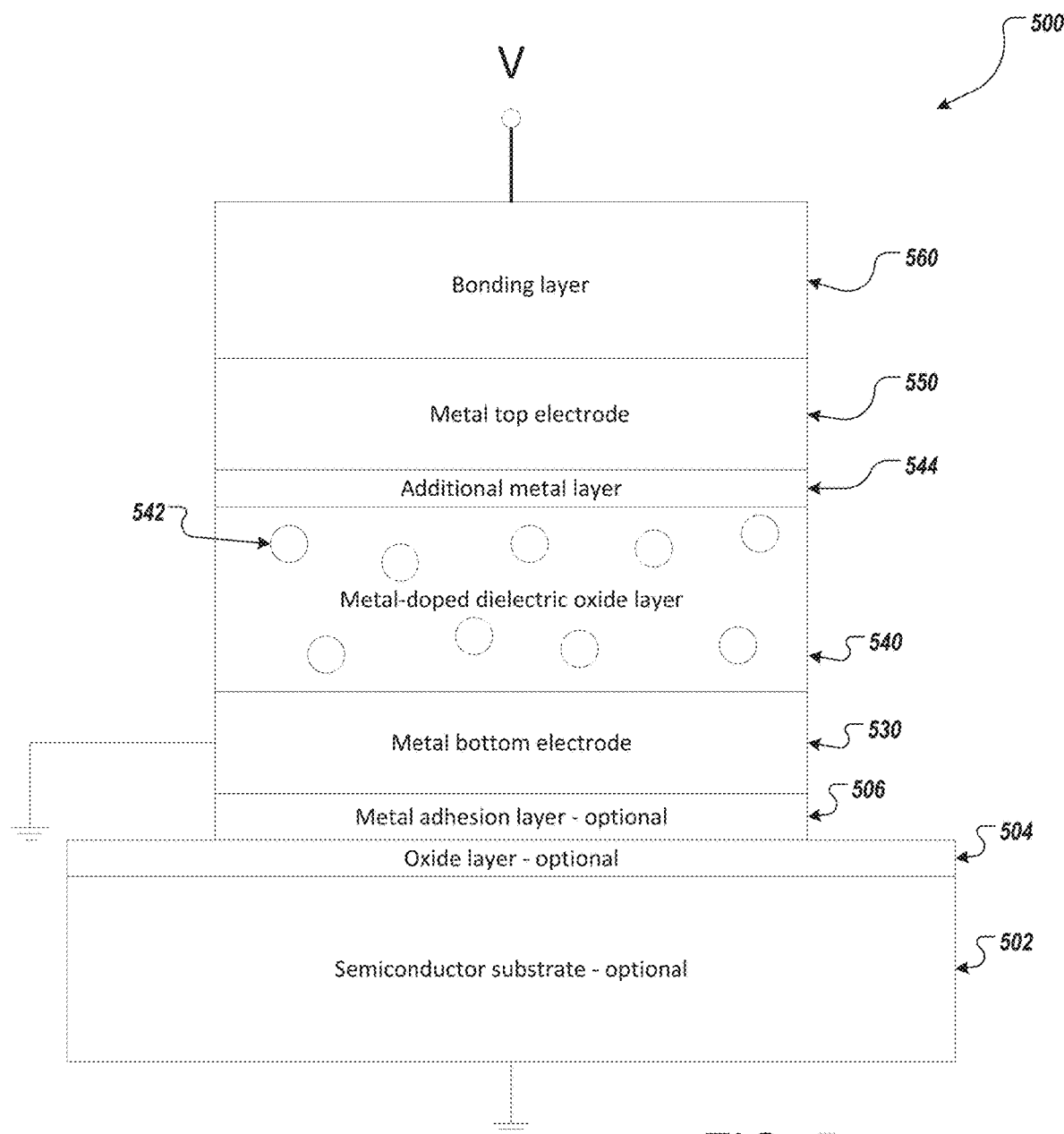
FIG. 5 illustrates a schematic diagram showing various layers of a diffusive memristor device.

FIG. 5 illustrates a schematic diagram showing various layers of a diffusive memristor device 500. In some implementations, the diffusive memristor 500 exhibits similar switching and electrical characteristics as the diffusive memristor 120. In some implementations, the diffusive memristor 500 is an example of the diffusive memristor 260 used in the TRNG circuit 200.

As shown in FIG. 5, the diffusive memristor 500 is fabricated on a semiconductor substrate 500. In some implementations, the substrate 500 is a silicon (Si) wafer. In other implementations, semiconductor substrate 102 is made of a different material.

In some implementations, an oxide layer 504 is formed on the substrate 502. In some implementations, the oxide layer 504 includes a silicon oxide (SiO$_x$). In some implementations, the oxide layer 504 includes silicon dioxide (SiO$_2$).

In some implementations, a metal adhesion layer 506 is deposited on the surface of the oxide layer 504 to create an adhesion surface for a bottom metal electrode 530. In some implementations, the metal adhesion layer 506 has a thickness of 1.5 nm or in a range thereabout. In some implementations, the metal in the adhesion layer 506 is titanium (Ti).

The diffusive memristor device 500 includes a metal bottom electrode layer 530. In some implementations, the metal bottom electrode 530 is fabricated to a thickness of approximately 15 nm. In some implementations, the metal bottom electrode 530 includes one of platinum (Pt), palladium (Pd) or titanium nitride (TiN).

The diffusive memristor device 500 includes a metal-doped dielectric oxide layer 540 that creates a switching layer. In some implementations, the oxide layer 540 is fabricated to a thickness of approximately 10 nm. In some implementations, the oxide layer 540 includes metal nanoclusters 542. In some implementations, the oxide in the layer 540 is a silicon oxide (SiO$_x$). In some implementations, the silicon oxide is silicon dioxide (SiO$_2$). In some implementations, the metal in the layer 540 is one of silver (Ag), copper (Cu) or lithium (Li).

In some implementations of the diffusive memristor device 500 with the metal nanoclusters 542, an additional metal layer 544 is formed on the dielectric insulating layer 540, with the same metal that is used for doping the oxide layer 540 being used for the nanoclusters 542 and the additional metal layer 544. For example, in some cases, the oxide layer 540 comprises a silver (Ag)-doped silicon dioxide (SiO$_2$) layer. In such implementations, the metal nanoclusters 542 are silver (Ag) nanoclusters, and the additional metal layer 544 includes a silver (Ag) layer. As another example, in some cases, the metal in the layer 540 is copper (Cu) and the additional metal layer 544 includes a copper (Cu) layer. As another example, in some cases, the metal in the layer 540 is lithium (Li) and the additional metal layer 544 includes a lithium (Li) layer.

The additional metal layer 544 operates as a reservoir of metal atoms to avoid any metal depletion during switching using the oxide layer 540. In some implementations, the additional metal layer 544 is fabricated to a thickness of approximately 5 nm. In some implementations, the metal nanoclusters 542 are not present. In some implementations, the additional metal layer 544 is not present.

The diffusive memristor device 500 includes a metal top electrode 550. In some implementations, the metal top electrode 550 is fabricated to a thickness of approximately 20 nm. In some implementations, the metal top electrode 550 includes the same metal as the metal bottom electrode 530. For example, the metal top electrode 550 can include platinum (Pt) when the metal bottom electrode 530 includes platinum (Pt). However, in other implementations, the metal top electrode 550 and the metal bottom electrode 530 include different metals. For example, in some implementations, the metal top electrode 550 includes one of palladium (Pd) or titanium nitride (TiN).

In some implementations, a bonding layer 560 is formed on the top surface of the metal top electrode 550. The bonding layer 560, which is optional, is included in some implementations for better contact with measurement probes. In some implementations, the bonding layer 560 is fabricated to a thickness of approximately 30 nm. In some implementations, the bonding layer 560 includes gold (Au) as the bonding metal. In other implementations, the bonding layer 560 includes platinum (Pt) as the bonding metal.

In the above manner, a novel diffusive memristor TRNG device utilizing stochastic delay time as the source of randomness can be implemented. The diffusive memristor TRNG circuit has a simple structure, and shows evident advantages in circuit complexity, scalability and power consumption, compared to prior TRNG devices.

Device Fabrication. In some implementations, the diffusive memristor device 120 (or the diffusive memristor device 260) described herein is fabricated on a silicon (Si) wafer 102 that includes a 100 nm thermally grown silicon oxide (SiO$_2$) layer 104 on top that forms the substrate for the device. For the 5×5 µm$^2$ micro-device (e.g., crossbar device 100), the bottom electrode is patterned by ultraviolet photolithography. After that, a 1.5 nm thick titanium (Ti) adhesion layer 106 and a 15 nm thick platinum (Pt) bottom electrode 130 are deposited sequentially in an electron beam evaporator, followed by a lift-off process in acetone. A 10 nm silver doped silicon oxide (Ag:SiO$_2$) blanket layer 140 is prepared by radio-frequency (RF) co-sputtering from silicon oxide (SiO$_2$) and silver (Ag) targets (power for SiO$_2$: 270 watts (W) and Ag: 12 W). The top electrode is defined by a second photolithography step and a 15 s oxygen (O$_2$) descum, metallization of a 5 nm silver (Ag) layer 144 using RF sputtering (100 W) and 20 nm platinum (Pt) layer 150/30 nm gold (Au) layer 160 deposition using electron beam evaporator and lift-off. The extra silver (Ag) layer 144 provides the diffusive memristor device 120, and more specifically the dielectric switching layer 140 a reservoir of silver (Ag) ions, while the gold (Au) layer 160 is added as an optional feature to improve the contact between electrical contact pads and probe tips.

Electrical Characterization. In one implementation, DC electrical characterizations are carried out using a Keysight B1500 semiconductor parameter analyzer operating in a voltage-sweep mode. In this implementation, voltage pulses are generated through a Keysight 33220A function/arbitrary waveform generator while the output waveforms are monitored by a Keysight MSO-X 3104T mixed signal oscilloscope. During all the electrical measurements, the bottom electrodes 130 are connected to a resistance to ground while the top electrodes 150/160 are biased.

Physical Characterization. The X-ray photoelectron spectroscopy (XPS) depth profile is acquired in a Physical Electronics Instruments (PHI) quantum 2000.

NIST Randomness Tests. In one implementation, a microcontroller (IAP15F2K61S2) is introduced to collect a large number of bits from the diffusive memristor TRNG device 200. To generate those sequences, input pulses (0.5 V, pulse width: 300 µs) at a frequency of 1 kHz are continuously sent by a voltage source 202 to the diffusive memristor 120 and a series resistor, for example resistor 204. The microcontroller's built-in 16-bit counter (11.0592 MHz) is used as the clock signal and collects the 6 lower-order bits (6 kbs$^{-1}$). NIST Statistical Test Suite (Special Publication 800-22) are downloaded from the NIST websites and then run in a virtual Linux system machine using the GNU Compiler Collection (GCC) compiler. The test suite contains 15 randomness tests and each test targets a specific aspect of randomness. Each test returned two statistics, P-value (except non-overlapping-template and random excursions variant) and pass rate. The bits are considered to be random if and only if the P-value≥0.0001 and the pass rate exceeds the minimum pass rate for each test.

Diffusive memristor dynamical simulations. To simulate resistive switching in the diffusive memristor 120, a generalized model is used where electric, heat and Ag-nanoparticle degrees of freedom were considered. In contrast, the memristor self-capacitance was also taken into account, which is important to describe the delay time distributions. The diffusion of silver (Ag)-nanoparticles is described by the Langevin equation (4), shown below:

$$\eta \frac{dx_i}{dt} = -\frac{\partial U(x_i)}{\partial x_i} + \alpha \frac{V(t)}{L} + \sqrt{2\eta k_B T} \zeta \quad (4)$$

In equation (4), $x_i$ describes the location of the i$^{th}$ Ag-nanoparticle, t is time, and η is the viscosity of Ag-nanoparticles. The potential profile U($x_i$), where Ag nanoparticles diffuse, is formed due to interfacial interactions, attracting small particles to the Ag-electrode and to the large cluster located near the electrode as well as large number of small minima due to pinning of Ag-nanoparticles to the device inhomogeneities and SiO$_2$ matric structure as well as repulsion from the Pt-electrode. The particular shape of potential (the potential profile used in simulations is shown in FIG. 4f) does not significantly affect the result. The only important property of the potential is the large minima associated with interfacial energy comparing with both temperature and depths of multiwell pinning potentials; the repulsive potential barrier of the Pt-electrode should be strong enough to ensure relaxation to high resistive state on a reasonable time scale when no voltage is applied. The second term in the right-hand-side of equation (4) is related to the electric bias/tilt of the potential in the electric field $$\frac{V(t)}{L}$$

if Ag-nanoparticles accumulate effective charge α (the strength of this electric force tilt of the potential used in simulation is given in Supplementary FIG. 8a (inset)). The last term in equation (4) represents the unbiased δ-correlated white noise $\zeta : \langle (t) \rangle = 0, \langle \zeta (0) \zeta (t) \rangle = \delta(t)$. The noise intensity is controlled by the temperature T (see FIG. 4f to estimate $k_B T_0$ with the Boltzmann constant $k_B$ and the background temperature $T_0$ with respect to the potential used in the simulations). In particular, the noise is responsible for overcoming the interfacial barrier which is suppressed by the electric force (in the simulations the electric field decreases the interfacial potential well by a factor of 1.6 at $V_{th}$); this results in switching the system to its low resistance state when a voltage pulse is applied. In addition, the noise generates the diffusion of Ag-nanoparticles toward the Ag-electrode when voltage is off resulting in the thermal relaxation of the memristors.

The heat dynamics in the memristor are described by Newton's cooling law, given by equation (5):

$$\frac{dT}{dt} = \mathbb{C}_T^{-1} Q - \kappa(T - T_0) \tag{5}$$

In equation (5), $\mathbb{C}_T$ is the memristor heat capacitance, $Q=V(t)^2/R(x_1, x_2, \ldots, x_N)$ is Joule heat power with memristor resistance $R(x_1, x_2, \ldots, x_N)$ which depends on Ag-nanoparticle locations, $\kappa$ is the heat transfer coefficient describing heat flux from the device. Note that the actual system temperature and the macroscopic-cluster temperature can be significantly different. We assume the resistance has a tunneling nature and is described by the equation $R(x)=R(x_1, x_2, \ldots, x_N)=R_t\Sigma_0^N e^{(x_{i+1}-x_i)/\lambda}$ where $x_0$ and $x_{N+1}$ are positions of the device terminals, $R_t$ is the resistance amplitude, and $\lambda$ is the tunneling length. The minimum possible resistance occurs when all Ag-nanoparticles are equally separated and has the value $R_{min}=(N+1)R_t e^{(x_{N+1}-x_0)/((N+1)\lambda)}$ (the value of $\lambda/L=0.12$ was used for 1D, and 0.2 was used for 3D simulations).

As a distributed system with high resistance the memristor can have a capacitance ($C_M$) which was not considered in previous models. In general, this capacitance could be different in the two memristor states, but for simplicity, it was assumed that $C_M$ is a constant and is not a function silver (Ag) nano-particle locations. A simple consideration of a circuit that includes the memristor resistance connected in parallel to the memristor capacitance results in equation (6) for voltage drop V(t) across the memristor:

$$\tau_0 \frac{dV}{dt} = V_{ex}(t) - \left(1 + \frac{R_{ex}}{R(x)}\right)V \tag{6}$$

In equation (6), "RC" time $\tau_0 = C_M R_{ex}$ with the resistance $R_{ex}$ of external wires connected in sequence with the memristor. In some implementations, $$\kappa\tau_0 = 16 \text{ and } \frac{R_{ex}}{R_{min}} = 0.5$$

are used.

Other Embodiments

Although a few implementations have been described in detail above, other modifications are possible. In addition, other components can be added to, or removed from, the described diffusive memristor and the diffusive memristor based true random number generator device. Accordingly, other implementations are within the scope of the following claims.

What is claimed is:

1. A diffusive memristor comprising:
   a bottom electrode;
   a top electrode formed opposite the bottom electrode;
   a dielectric layer disposed between the top electrode and the bottom electrode, the dielectric layer comprising silver doped silicon oxide (Ag:SiO$_x$); and
   a silver (Ag) layer formed between the dielectric layer and the top electrode.

2. The diffusive memristor of claim 1, wherein the silver layer includes a reservoir of silver atoms that are used for forming conduction channels in the dielectric layer during switching.

3. The diffusive memristor of claim 1, wherein at least one of the bottom electrode or the top electrode includes a layer of one of platinum (Pt), palladium (Pd) or titanium nitride (TiN).

4. The diffusive memristor of claim 1, wherein the diffusive memristor is formed on a substrate.

5. A diffusive memristor comprising:
   a bottom electrode;
   a top electrode formed opposite the bottom electrode;
   a dielectric layer disposed between the top electrode and the bottom electrode, the dielectric layer comprising an oxide doped with a metal; and
   a layer of the metal formed between the dielectric layer and the top electrode.

6. The diffusive memristor of claim 5, wherein the oxide includes a silicon oxide (SiO$_x$) and the metal includes one of silver (Ag), copper (Cu) or lithium (Li).

7. The diffusive memristor of claim 5, wherein at least one of the top electrode or the bottom electrode includes one of platinum (Pt), palladium (Pd) or titanium nitride (TiN).

* * * * *